Jan. 24, 1967 J. F. BROWN 3,300,142

ROCKET NOZZLE CAPABLE OF INDUCING FLOW SEPARATION

Filed June 25, 1963

INVENTOR.
JOHN F. BROWN
BY
ATTORNEYS

United States Patent Office 3,300,142
Patented Jan. 24, 1967

3,300,142
ROCKET NOZZLE CAPABLE OF INDUCING
FLOW SEPARATION
John F. Brown, Del Mar, Calif., assignor to Whittaker
Corporation, a corporation of California
Filed June 25, 1963, Ser. No. 290,472
2 Claims. (Cl. 239—265.15)

The present invention is directed to rocket nozzles. More particularly, the present invention is directed to rocket nozzles which are capable of inducing flow separation in the nozzle.

In general, rocket nozzles comprise a convergent section, a throat section and a divergent section. These nozzles are subjected to extremely severe environmental conditions, particularly with regard to temperature and heat flux. These conditions are especially severe in the throat section of the rocket nozzle. Thus, it has become common practice to fabricate the convergent and divergent sections of the nozzle from ablative materials and to provide the throat section with a refractory insert known as a "throat insert." The principal requirements which must be met by a refractory throat insert are resistance to thermal shock, erosion resistance and high melting point. However, the temperature limit of refractory throat inserts cannot be increased beyond 6700° F. by any known method. However, temperature requirements of 7000° F. and higher for rocket nozzles have and will continue to become necessary for the continuing increases in propellant combustion temperatures.

Thus, it is a primary object of the present invention to provide a rocket nozzle which will withstand high temperatures and heat fluxes without undesirable erosion and which may be fabricated from available materials.

It is another object of the present invention to provide a rocket nozzle which will induce flow separation in the throat section.

It is a further object of the present invention to provide a rocket nozzle having a configuration such that incoming fluids are directed substantially radially, inwardly, i.e., in a direction substantially perpendicular to the axis of the nozzle.

Other objects and advantages of the present invention, it is believed, will be apparent from the following description of specific embodiments thereof when read in connection with the drawings.

Briefly, the present invention comprises rocket nozzles which have a configuration capable of inducing flow separation. It is particularly desired to induce flow separation at the nozzle throat thereby minimizing convective heating and, consequently, erosion in this region. This separation makes possible the use of ablative materials in the nozzle throats because ablative materials are not limited by temperature since material degradation is a part of the ablation process. In general, the nozzles of the present invention induce flow separation by providing a radial approach to the throat. Thus, the nozzles of the present invention are provided with convergent sections which will direct incoming fluids in a direction substantially perpendicular to the axis of the nozzle. A preferred embodiment of the nozzle of the present invention is one having a hemispherical convergent section. Although the present invention is not to be considered to be limited by any particular theory, it would appear that, in addition to providing a radial flow approach, the flow over the concave surface of the hemispherical convergent section is unstable. Thus, the tendency for the flow to depart from this concave surface is increased by the adverse pressure gradient. Fluid flow over a concave surface is characterized by early boundary layer transition (from laminar to turbulent) and is believed to increase early and more complete flow separation.

In the nozzle of the present invention, flow attachment to the nozzle is again established downstream after separation. Since the flow is separated, there is effectively no boundary layer upon reattachment. Upon first impression, this might appear to be disadvantageous since any boundary layer can be considered a form of insulation and the region of attachment will have a higher than normal heat flux. However, the configuration of the nozzles of the present invention causes a constriction of flow, often referred to as the "vena contracta" downstream of the throat entry. This occurs because the approximately radial approach of the flow results in curving of the streamlines. Since the curving streamlines have approximately the same center of curvature, a pressure gradient exists across the flow. Therefore, the pressure continues to drop as the fluid passes the throat entry with a resulting velocity increase toward the center of flow. Consequently, the location of the minimum cross-sectional flow area occurs downstream of the restriction, generally at a distance of about one-half the throat diameter. In a nozzle having a hemispherical convergent section, the minimum flow area is usually about 80% of the throat area. Thus, since the minimum flow area is controlled by conditions upstream of the region of reattachment and since the reattachment will occur in a region where the area ratio, i.e., the cross-sectional area at any point in the nozzle divided by the minimum cross-sectional flow area, is greater than 1, the heat flux will be lower than at the throat. It is, of course, known that the heat flux is a maximum at the throat as explained in Bartz, Jet Propulsion, January 1957, page 49. Thus, erosion upon reattachment is not undesirably severe in the nozzles of the present invention.

In general, it is preferred to fabricate the nozzles of the present invention from ablative materials. However, it has been found that any insulating material with a high surface temperature, e.g., 50% or more of the total gas temperature may be used. In addition, materials which provide a flow of a cooling gas through the material and into the boundary layer are preferred. The cooling gas may be evolved through the decomposition of all or part of the insulating material which generally occurs when ablative materials are used or may be introduced from a source external to the nozzle. Ablative materials are preferred because they accommodate virtually any temperature or heat flux condition, automatically control the surface temperature, greatly restrict any internal flow of heat and expend a large quantity of heat energy for each pound of material. These capabilities are the result of a self-regulating, orderly and gradual removal of exposed surface materials which takes place during interaction of the high temperature environment with the material. In general, the following three conditions occur: (1) charring of the surface which reduces the thermal conductivity through the material (2) degradation of the material resulting in the absorption of heat energy and (3) generation of gas during the degradation process which evolves through the char layer and helps to cool this region. The generated gases are finally introduced into the boundary layer adjacent to the nozzle wall, thereby further reducing heat flow to the ablative material.

Typical ablative materials are curable mixtures of phenolic resin and high silica fibers, curable mixtures of nitrile rubber, phenolic resin, calcium carbonate and asbestos fibers and curable mixtures of nitrile rubber, phenolic resin, carbon black and asbestos fibers. These and other ablative materials can be molded into the rocket nozzles of the present invention.

Referring now to the drawings, FIGURE 1 illustrates a nozzle of the present invention having a hemispherical convergent section.

FIGURE 2 illustrates a nozzle of the present invention having a hemispherical convergent section with a step therein.

FIGURE 3 of the present invention illustrates a nozzle of the present invention having a series of holes parallel to the axis of the nozzle leading to the hemispherical convergent section of the nozzle.

Figure 1:
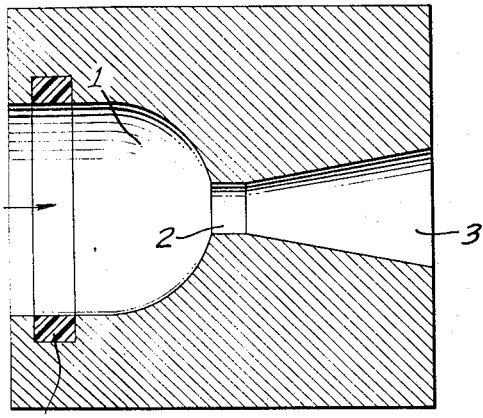

The nozzle illustrated in FIGURE 1 comprises a hemispherical inlet portion 1, a throat 2 and a divergent portion 3. A sacrificial barrier, 14, is illustrated upstream of the inlet portion 1. Flow through the nozzle proceeds through convergent portion 1 and then through throat 2 and finally through divergent portion 3. A nozzle having this configuration was constructed with the radius of curvature of convergent portion 1 being 0.4 inch, the diameter of throat 2 being 0.21 inch, the length of throat 2 being 0.152 inch, the half-angle of divergent portion 3 being 27°, the total axial length of the nozzle being 0.64 inch and the maximum diameter of the divergent section being 0.3 inch. This nozzle was compared with a standard test nozzle having a conical convergent section having a half-angle of 30° and a maximum diameter of 0.8 inch. The axial length of this test nozzle was 0.85 inch, the throat diameter was 0.163 inch, the throat length was 0.25 inch and this nozzle was constructed without a divergent section. Each of these nozzles was fabricated from a carbon fiber ablation material designated 4030 by the manufacturer (Narmco).

Each of these nozzles was tested in a rocket engine having a thrust of ten pounds, which used a hydrogen-oxygen propellant combination. The estimated combustion temperature of this engine was 5,460° F., the calculated gas velocity at the nozzle throat was 4,510 feet per second and the pressure in the engine chamber was 315 p.s.i.a.

The nozzle of FIGURE 1 and the test nozzle were each placed in the test engine and the engine was fired. Readings of the nozzle throat diameter were taken at time increments of about one second. It was found that the erosion rate of the nozzle of the present invention was 23% less than that of the test nozzle. Furthermore, extrapolation of the throat diameter readinvention was 23% less than that of the test nozzle. Furthermore, extrapolation of the throat diameter readings for the nozzle of the present invention to time equals zero indicated an initial diameter of approximately 0.183 inch for this nozzle. This, of course, is substantially less than the actual throat diameter and establishes that flow separation occurred in the nozzle of the present invention which reduced the effective throat cross-sectional area to about 80% of the actual throat cross-sectional area.

Figure 2:
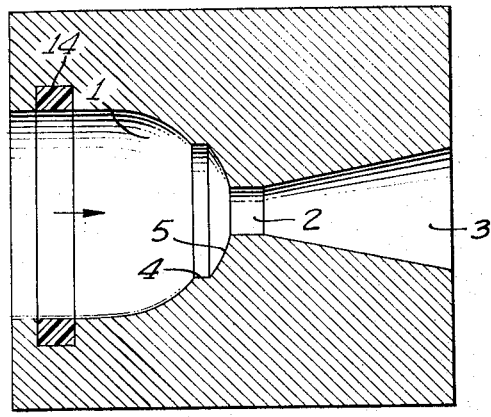

The nozzle illustrated in FIGURE 2 is similar to that illustrated in FIGURE 1 in that it has a generally hemispherical convergent section 1, a throat 2 and a divergent section 3. In addition, the nozzle illustrated in FIGURE 2 is provided with step 4 and interior hemispherical convergent section 5. Step 4 has a dual purpose. First, since the boundary layer is turbulent at the throat where it has a Reynolds number of about $8 \times 10^6$ in typical rocket engines, transition from a laminar boundary layer may take place in the convergent section. Step 4 tends to induce early transition and to promote a thicker turbulent boundary layer than would otherwise occur as the flow approaches the throat. Second, step 4 is believed to enhance flow instability and aid in flow separation.

Nozzles having the design illustrated in FIGURE 2 were constructed from a curable mixture of phenolic resin and high silica fibers prepared by mechanically chopping a high silica fabric which had previously been impregnated with phenolic resin. This material is available as Narmco 525T2 and was molded into the nozzles. The radius of curvature of exterior convergent section 1 of these nozzles was 0.4 inch and the radius of curvature of interior convergent section 5 was the same. The throat diameter was 0.182 inch and the throat length was 0.1 inch. The depth of the step 4 was 0.05 inch. The half-angle of divergent section 3 was 10°, its length was 0.7 inch and the total axial length of the nozzle was 1.25 inches. Three nozzles having the step in a different location, viz., at 0.5 inch diameter, 0.6 inch diameter, and 0.7 inch diameter were constructed. These nozzles were tested in the same manner as that described with regard to the nozzles illustrated in FIGURE 1. Each of the nozzles was characterized by an extremely low erosion in the early portion of the firings and the minimum flow cross-sectional area at time equals zero was calculated to be 0.163 inch thereby establishing that a substantial amount of flow separation occurred.

Figure 3:
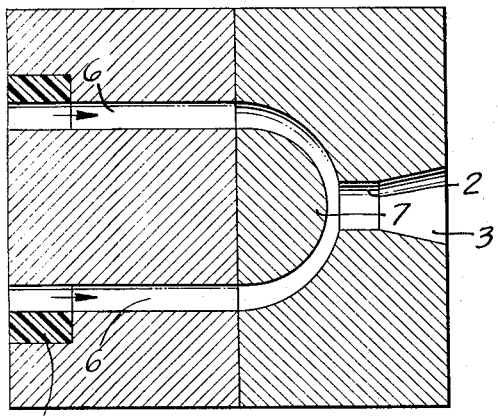

Another embodiment of the nozzle of the present invention is shown in FIGURE 3. In this nozzle, a plurality of holes, e.g., six, preferably equally spaced apart form the entry section of the nozzle. These holes are indicated by numeral 6. The holes 6 may be axial or may be drilled at an angle, e.g., 45°, to the nozzle axis thereby inducing a rotation of the flow through the nozzle. This nozzle is also provided with a central plug 7 which is hemispherical and cooperates with hemispherical convergent section 1 to define a hemispherical annular cavity. The nozzle is also provided with throat 2 and divergent section 3.

Figure 4:
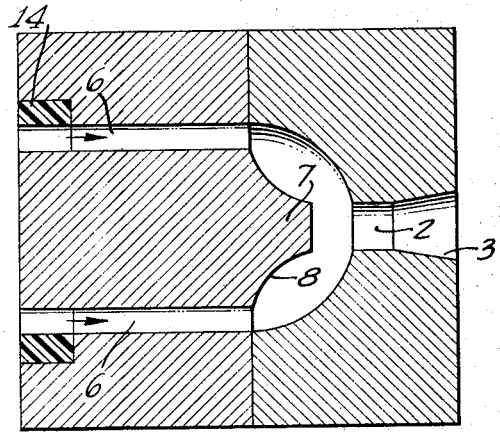
FIGURE 4 illustrates a nozzle similar to that illustrated in FIGURE 3 with the additional feature that undercut concave surfaces are provided adjacent to the hemispherical convergent section.

The nozzle illustrated in FIGURE 4 is similar to that illustrated in FIGURE 3, with the exception that central plug 7 is provided with concave surface 8. This nozzle may also be constructed without hemispherical plug 7 thereby forming a hemispherical cavity rather than an annulus within the nozzle. Nozzles having the configurations illustrated in FIGURES 3 and 4 were fabricated from Narmco 525T2 and were tested in the same manner as the nozzles illustrated in FIGURES 1 and 2. Each of these nozzles induced flow separation. The calculated minimum cross-sectional flow area for a nozzle having the configuration illustrated in FIGURE 3 with six equally spaced inlet holes drilled at a 45° angle to the nozzle axis was 0.154 inch while that for the nozzle 4 was 0.1777 inch as compared with an actual throat diameter of 0.183 inch. However, erosion in holes 6 of the nozzles illustrated in FIGURES 3 and 4 indicated that these nozzles would be less efficient than the nozzles illustrated in FIGURES 1 and 2.

Figure 5:
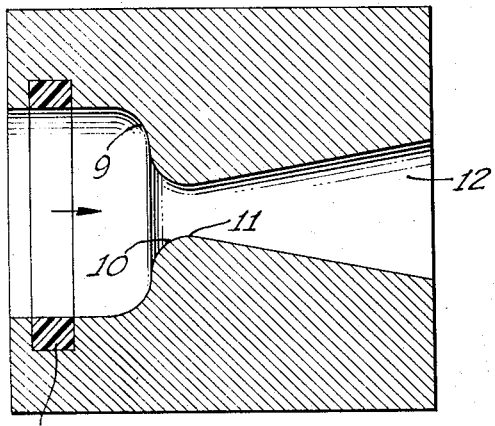
FIGURE 5 illustrates a nozzle of the present invention having a curvilinear convergent section.

The nozzle illustrated in FIGURE 5 is provided with a reflex curvature entry with a concave curvature 9 at the beginning at the convergence and a convex curvature 10 at the approach to the throat 11. This nozzle may also be provided with a divergent section 12. Nozzles having this design were fabricated from Narmco 525T2 and were found to exhibit flow separation at the throat.

Figure 6:
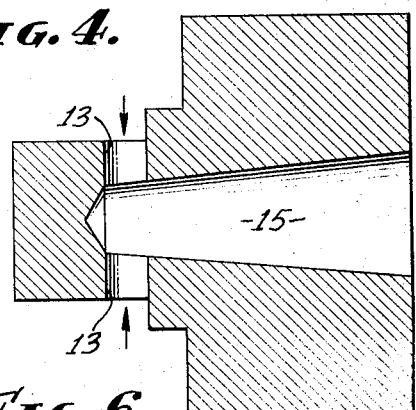
FIGURE 6 illustrates a nozzle of the present invention having a convergent section perpendicular to the axis of the nozzle.

The nozzle illustrated in FIGURE 6 is provided with a completely radial entry section comprising a plurality of holes 13 leading into a conical divergent section 15. Any suitable number of holes, e.g., three, may be used and are preferably equally spaced. A nozzle having this design was fabricated from Narmco 525T2. This nozzle was tested in the manner previously described and the calculated initial effective throat area was approximately 60% of the area based on the nozzle diameter at the center line of the inlet holes 13. The actual erosion rate of this nozzle was found to be 77% of that of the standard test nozzle. This nozzle also exhibited flow separation.

As is evident from the foregoing description of specific embodiments of the present invention, the induced flow separation nozzles of the present invention demonstrate superior performance as compared with conventional designs. Use of the nozzles of the present invention with solid propellants would reduce the demands for heavy and costly refractory metal throat inserts. Perhaps more important, nozzles of the present invention fabricated from ablative or similar materials would not be limited to contemporary propellant temperatures. Contrary to refractory materials which have a definite melting point and cannot be used at temperatures above 7,000° F., ablative materials have no effective melting temperature and ablation is only slightly increased by higher temperatures.

The principal advantage of the induced flow separation nozzles of the present invention is the removal of high temperature, high velocity exhaust gases from the nozzle throat. This eliminates the mechanism of convective heat transfer as well as the high shear environment. Since the nozzles of the present invention reduce the effective minimum throat diameter, the momentum forces and heat transfer mechanisms are distributed over a larger throat surface which would be significant even if flow separation did not occur.

In general, it has been found that wall pressure in the throat region of the nozzles of the present invention is approximately 33% of that of conventional nozzles.

Furthermore, it has been found that the provision of a sacrificial barrier, illustrated as 14 in FIGURES 1 through 5, which will evolve gases into the boundary layer may improve the performance of the nozzles of the present invention. For example, when a cylindrical sacrificial barrier comprising a curable mixture of nitrile rubber, phenolic resin, carbon black and asbestos fibers available as Narmco F80 having an inside diameter of 0.8 inch and an axial length of 0.25 inch was positioned upstream of the convergent section of the nozzle illustrated in FIGURE 1 and having the dimensions described with respect to the specific embodiment of FIGURE 1, radial erosion rates as low as 41% of those obtained for the standard test nozzle were achieved.

It will be readily apparent to those skilled in the art, that the induced flow separation nozzles of the present invention may be modified in numerous ways without departing from the scope of the present invention. Thus, having fully described the present invention, it is to be understood that it is not to be limited to the specific details set forth, but is of the full scope of the appended claims.

I claim:
1. A rocket nozzle comprising an ablative material having a convergent inlet section adapted to direct incoming gases substantially radially inwardly so as to induce flow separation, said nozzle being provided with a sacrificial barrier means upstream of said inlet section for generating gases to promote flow separation.

2. A rocket nozzle having a convergent inlet section adapted to direct incoming gases substantially radially inwardly so as to induce flow separation, said convergent section being substantially hemispherical in shape and having a step therein, said step comprising a portion of the inlet section forming a cylinder concentric with the throat.

References Cited by the Examiner
UNITED STATES PATENTS

| | | | |
|---|---|---|---|
| 2,206,057 | 7/1940 | Skinner | 60—35.6 |
| 2,489,953 | 11/1949 | Burney | 60—35.6 X |
| 2,497,888 | 2/1950 | Hirschfelder | 60—35.6 |
| 2,835,107 | 5/1958 | Ward | 60—35.6 |
| 2,909,032 | 10/1959 | Davies | 60—35.6 |
| 2,975,588 | 3/1961 | Smith | 60—35.6 |
| 2,990,684 | 7/1961 | Cohen | 60—35.6 |
| 3,122,884 | 3/1964 | Grover et al. | 60—35.6 |
| 3,125,955 | 3/1964 | Estes | 60—35.6 X |
| 3,142,960 | 8/1964 | Bluck | 60—35.6 |
| 3,172,252 | 3/1965 | Boek | 60—35.6 |

FOREIGN PATENTS 525,983    5/1955    Italy.

CARLTON R. CROYLE, *Primary Examiner.*

MARK NEWMAN, *Examiner.*